(12) United States Patent
Svetlik

(10) Patent No.: US 6,401,922 B1
(45) Date of Patent: *Jun. 11, 2002

(54) PORTABLE CONTAINER FOR SAW BLADE AND OTHER TABLE SAW ACCESSORIES

(75) Inventor: Kenneth N. Svetlik, Schaumburg, IL (US)

(73) Assignee: S-B Power Tool Corporation, Broadview, IL (US)

(*) Notice: Subject to any disclaimer, the term of this patent is extended or adjusted under 35 U.S.C. 154(b) by 12 days.

This patent is subject to a terminal disclaimer.

(21) Appl. No.: 09/667,833

(22) Filed: Sep. 21, 2000

Related U.S. Application Data

(63) Continuation of application No. 09/373,338, filed on Aug. 12, 1999, now Pat. No. 6,164,447.

(51) Int. Cl.7 ............................................. B65D 85/28
(52) U.S. Cl. ...................... 206/373; 206/493; 206/483; 206/815; 220/841
(58) Field of Search ................................ 206/349, 372, 206/373, 376, 379, 493, 303, 483, 480, 308.1, 309, 815, 576, 470, 471; 220/324, 841, 4.82, 4.23

(56) References Cited

U.S. PATENT DOCUMENTS

| 2,459,460 A | 1/1949 | Segal |
| 2,699,865 A | 1/1955 | Bowen ........................ 206/373 |
| 3,053,424 A | 9/1962 | Reinhard |
| 3,261,454 A | 7/1966 | Elson et al. ................. 206/349 |
| 3,317,076 A | 5/1967 | Enders |
| D218,922 S | 10/1970 | De Vore et al. |
| 3,596,822 A | 8/1971 | Holley |
| D222,012 S | 9/1971 | Harris |
| 3,870,148 A | 3/1975 | Hite |
| 3,878,939 A | 4/1975 | Wilcox ........................ 206/373 |
| D247,459 S | 3/1978 | Tennison |
| D255,730 S | 7/1980 | McLean |
| D260,456 S | 9/1981 | Davies et al. |
| D271,918 S | 12/1983 | Ramirez |
| 4,588,082 A | 5/1986 | Ridings |
| 4,611,713 A | 9/1986 | Byrns |
| 4,784,263 A | 11/1988 | Stanley |
| 4,896,771 A | 1/1990 | Edwards |
| D310,912 S | 10/1990 | Dennis |
| D314,471 S | 2/1991 | Lueth |
| D320,697 S | 10/1991 | Eggan |
| 5,078,266 A | 1/1992 | Rackley |
| D332,867 S | 2/1993 | Blake, Jr. |
| D338,337 S | 8/1993 | Roe, Jr. |
| 5,638,952 A | 6/1997 | Kim ........................ 206/307.1 |
| 5,797,488 A | 8/1998 | Yemini |
| 6,113,202 A | 9/2000 | Germano ..................... 206/373 |

Primary Examiner—Shian Luong
(74) Attorney, Agent, or Firm—Gardner Carton & Douglas

(57) ABSTRACT

A portable container to hold saw blades and accessories for a table saw has a cover and a base and an integrally formed handle at one end. The handle includes a snap latch and a push-to-release button assembly to hold the container in a closed position and that can be depressed to open the container. The assembly is positioned on the outer edge of the handle. The container also includes a raised position on the cover in which a flat wrench can be stored. Other tools are stored within the container by retaining tabs forms on the inner side of the cover. A post is extends for the inner side of the base to hold the blades and the flat wrench. The post is tubular so that the container can be removably attached to a table saw.

5 Claims, 6 Drawing Sheets

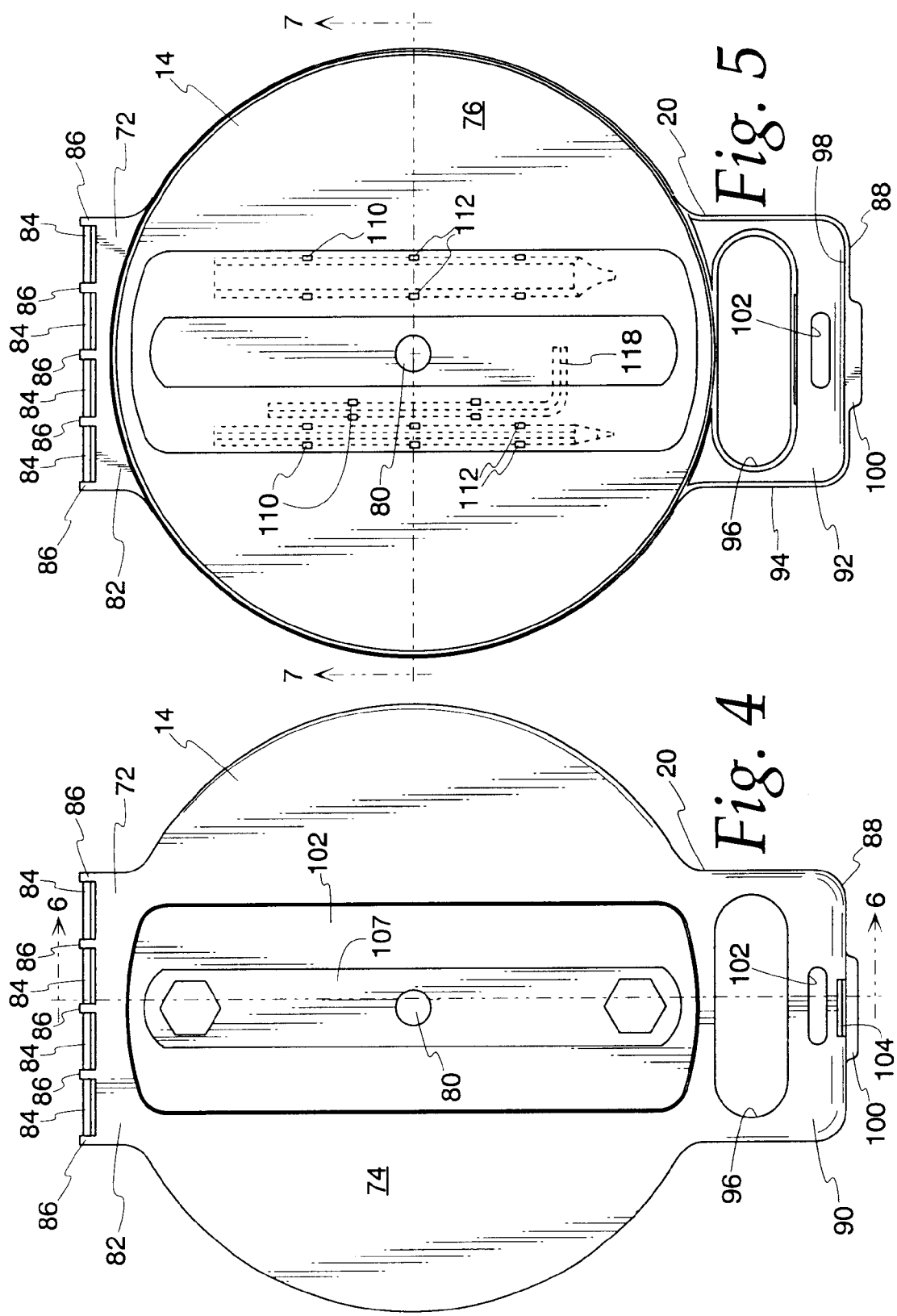

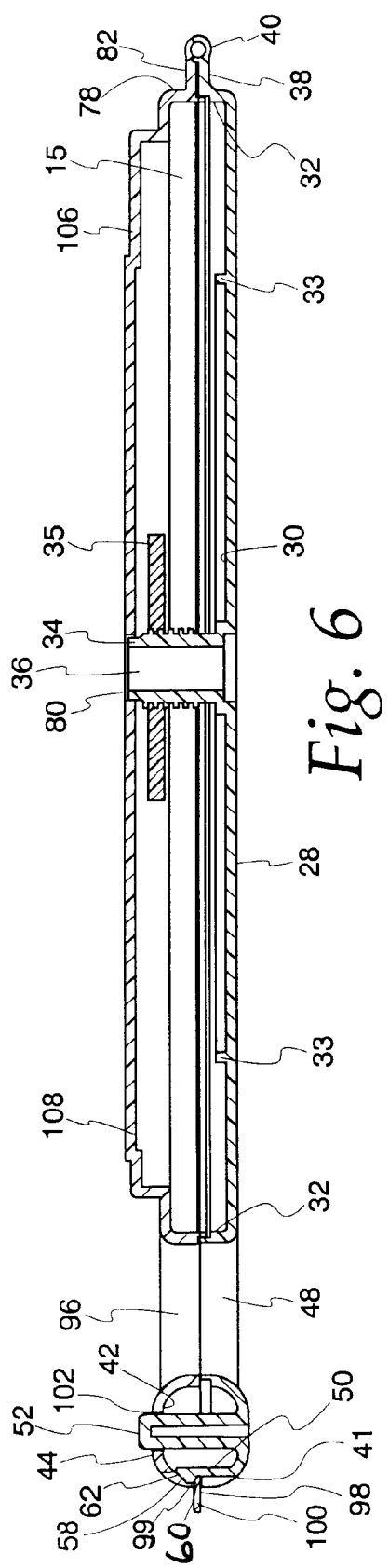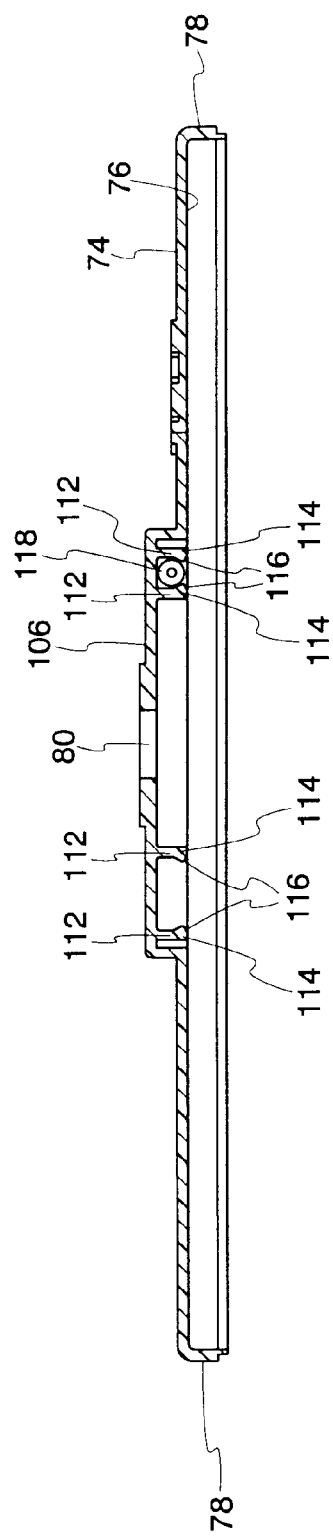

PORTABLE CONTAINER FOR SAW BLADE AND OTHER TABLE SAW ACCESSORIES

This is a Continuation Application of U. S. patent application Ser. No. 09/373,338, filed Aug. 12, 1999, now U. S. Pat. No. 6,164,447.

BACKGROUND OF THE INVENTION

1. Field of the Invention

The present invention to holding devices for saw blades and more particularly to a portable container to hold saw blades and other table saw accessories where the container can be connected to the side of a table saw.

2. Scope of the Prior Art

Containers and carrying cases of various types have long been used to hold saw blades for use with a table saw and the like. Prior art container have also been used to hold other table saw accessories such as wrenches used to secure the blade to the saw. The known containers take on different configurations and hold blades and other components in different ways. Some such containers include a frame having a post in the center. The center hole of the blade fits over the post and the blades are held to the frame by a wing nut or other suitable fastener. A handle can be provided to carry the container.

In other embodiments, such as that revealed in U.S. Pat. No. D218,922 to DeVore et al., U.S. Pat. No. 5,078,266 to Rackeley, and U.S. 5,797,488 to Yemini reveal containers that have clam-shell design with a base and a cover. The saw blade is held within the internal cavity formed by the base and cover. A handle can also be provided for the container. Various types of mechanisms are used to hold the base and cover closed. For example, the patents to DeVore and Yemini and U.S. Pat. No. 4,588,082 to Ridings, U.S. Pat. No. 4,611,713 to Byrns each disclose snap latches to hold the container in the closed position. The designs of those prior art mechanisms do not always hold the container closed after repeated use. In addition, they are not located on the container or the handle in a position that is easily accessibly to open the container.

In addition, a number of patents, e.g. U.S. Pat. No. D271,918 to Ramirez, U.S. Pat. No. D320,697 to Eggan and U.S. Pat. No. D332,867 to Blake, Jr., reveal saw blade carrying. cases that have a hole extending through the carrying cases. Generally, a screw is inserted into the hole to hold the container closed. The prior art does not utilize the hole to secure the container to the saw.

As mentioned, prior art containers have been designed to hold accessories that are used with the saw, such as Allen wrenches. For example, U.S. Pat. No. 4,784,263 to Stanley includes a cavity that is used to receive a blade tool. The slots and cavities revealed by the prior art are not always easily accessibly and it can be difficult to remove the tools from them. What is needed is a means to hold various types of table saw accessories within the cavity so that the accessories are easily accessible and removable from the container yet secured when stored.

SUMMARY OF THE INVENTION

The present invention relates to a portable container to hold saw blades and other table saw accessories that overcomes the deficiencies of the prior art. The container is made of a cover and a base that are hinged together and has a handle to carry the container. The container includes a snap latch and push-to-release button combination at the outer end of the handle. The combination is positioned for easy access to open the container with one hand. In addition, the combination's design secures the container in the ed position by way of a bolt that passes through the center hole. The container also includes at least one set of retaining tabs formed on the inner surface of the container. The retaining tabs are arranged to hold various types of table saw accessories such as a pencil, a flat pencil or an Allen wrench. A raised portion can be provided on the cover so that container also holds the table saw accessories. In a preferred embodiment, the post that holds the blade also supports the flat wrench that slides over the post. A nut is provided to hold the blades and the flat wrench in place. The post can be tubular so that a bolt can secure the container to the table saw.

The container of the present invention includes a base and a cover. The base has generally circular center portion having a base handle portion and a diametrically opposing hinge portion integrally formed with the center portion. The base has an outer side and an inner side and a flange extending from the inner side around the center of the base. A tubular post extends from the center portion. The base handle portion includes a center hole between an outer edge and the circular center portion. An opening is provided in the flange that is around the perimeter of the handle portion. Adjacent the slot, a snap latch. extends perpendicularly from the inner side of the handle portion. The snap latch has a generally triangular portion at its upper end pointing in the direction of the outer edge. A press button is also provided between the snap latch and the center hole.

The cover also has a generally circular center portion having a cover handle portion and a diametrically opposed hinge portion. The cover has a outer side and an inner side and a flange extending from the inner side around the center portion that mates with the tubular post. A hole is formed at the center of the center portion. The base handle portion includes a center hole portion between an outer edge and the circular center portion. A ledge is provided in the flange that is around the perimeter of the handle portion so that the ledge is generally parallel to the inner surface. Adjacent the ledge, a slot eYnds proximate the outer edge of the handle portion. A button hole is provided between the slot and the center hole. Within the center portion, a raised portion extends out from the outer side and is open to the inner side. In the preferred embodiment, the raised portion extends between the cover handle portion and the hinge portion. On the inner side of the raised portion, at least one set of retaining tabs is configured so as to hold a table saw accessories.

As assembled, the base and cover hinge portions are connected so that the container has a generally clam-shell arrangement. Accordingly, the base and cover move between an open and a closed positions. In the closed position, the handle portions mate so that the center holes are aligned to form a handle for the container. The triangular portion of the snap latch engages with the ledge formed on the outer edge of cover portion. The button also extends through the button hole. As the snap latch engages with the ledge, the cover is secured into the closed position with the base portion. In order to open the container, the snap latch is depressed through the opening as the press button is depressed. The snap latch disengages from the ledge and the container can open. The configuration of the snap latch and the press-to-release button between the outer edge and the center hole makes it easy to open the container as the container is held by the center hole. In addition, the configuration is strong enough to hold the container in the closed position.

The center hole of typical saw blades slide over the tubular post. The center portion's shape of the center portion accommodates the circular shape of the blades. A flat wrench having a center hole can also slide over the post. As mentioned, various table saw accessories will fit into the retaining tabs. As the post is tubular, the, container can be secured to a side of the table saw by a suitable fastener. The shape and features of the container allow it to be easily stored on the saw and provide enough space to hold multiple tools used by the saw. This is particularly advantageous for use with portable saws. Accordingly, all the tools necessary to operate and use the saw are held in a central place and attached to the saw for easy transport.

These and numerous other features and advantages of the present invention will become readily apparent from the following description, the accompanying drawings and the appended claims.

BRIEF DESCRIPTION OF THE DRAWINGS

FIG. 4 shows the outer side of the cover for the container of the present invention.

FIG. 5 shows the inner side of the cover;

FIG. 6 is a cross-sectional view of the container taken along the line 6—6 in FIG. 4;

FIG. 7 is a cross-sectional view of the cover taken along the line 7—7 in FIG. 5;

DETAILED DESCRIPTION OF THE PREFERRED EMBODIMENT

Figure 1:
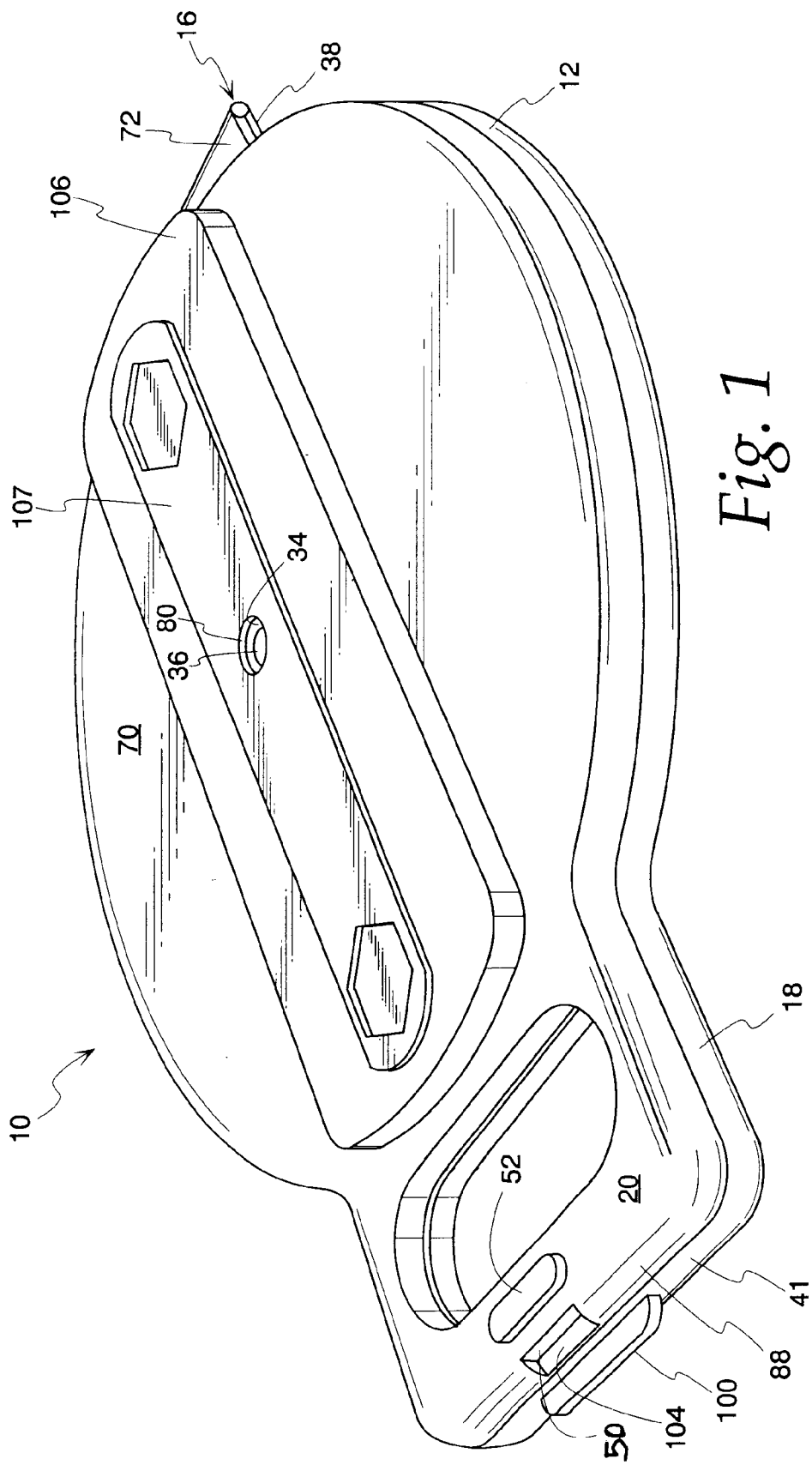
FIG. 1 illustrates a perspective view of portable container, which is made in accordance with the principles of the present invention, shown in the closed position.
Figure 2:
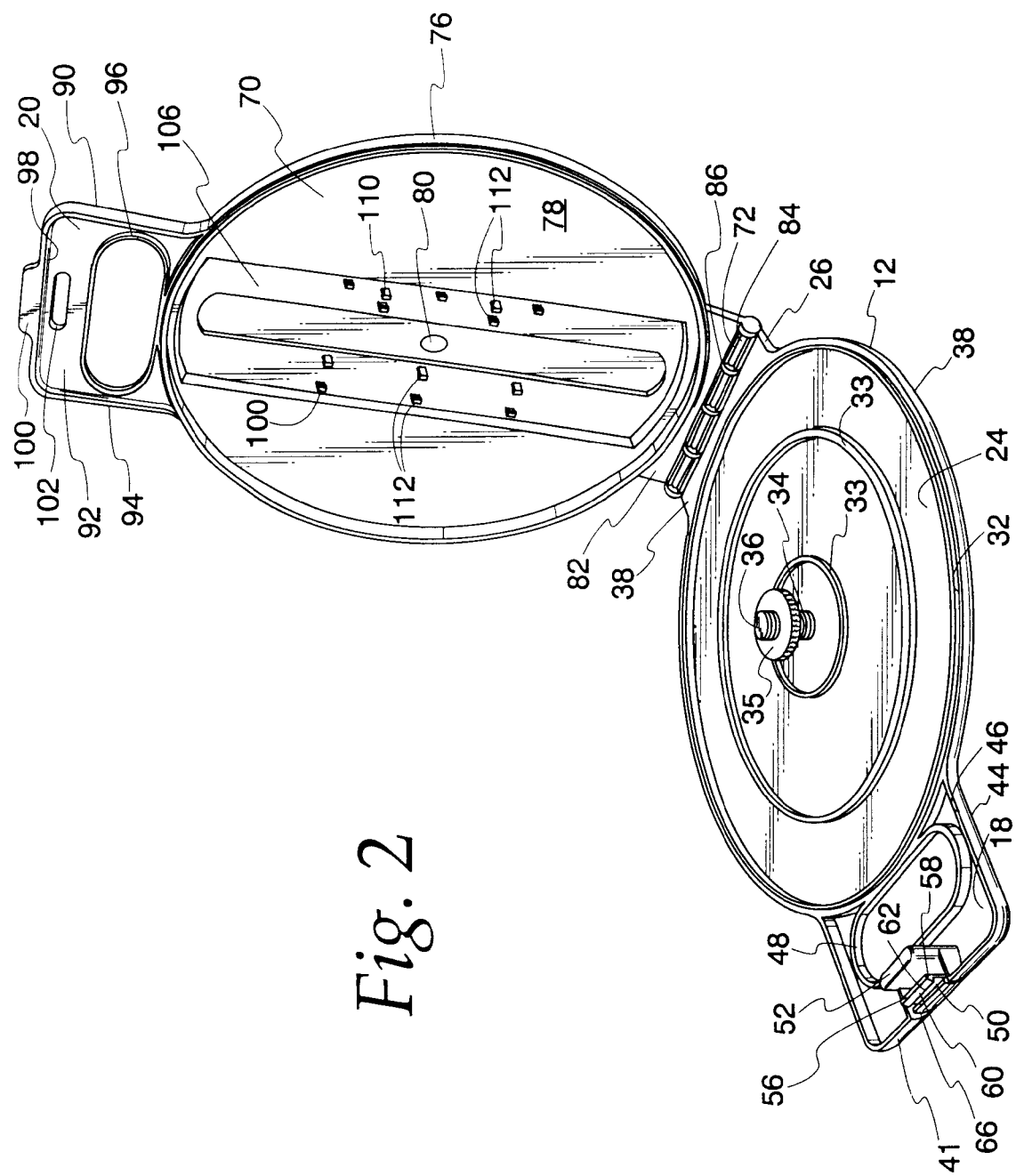
FIG. 2 illustrates a perspective view of the portable container shown in the open position.
Figure 3:
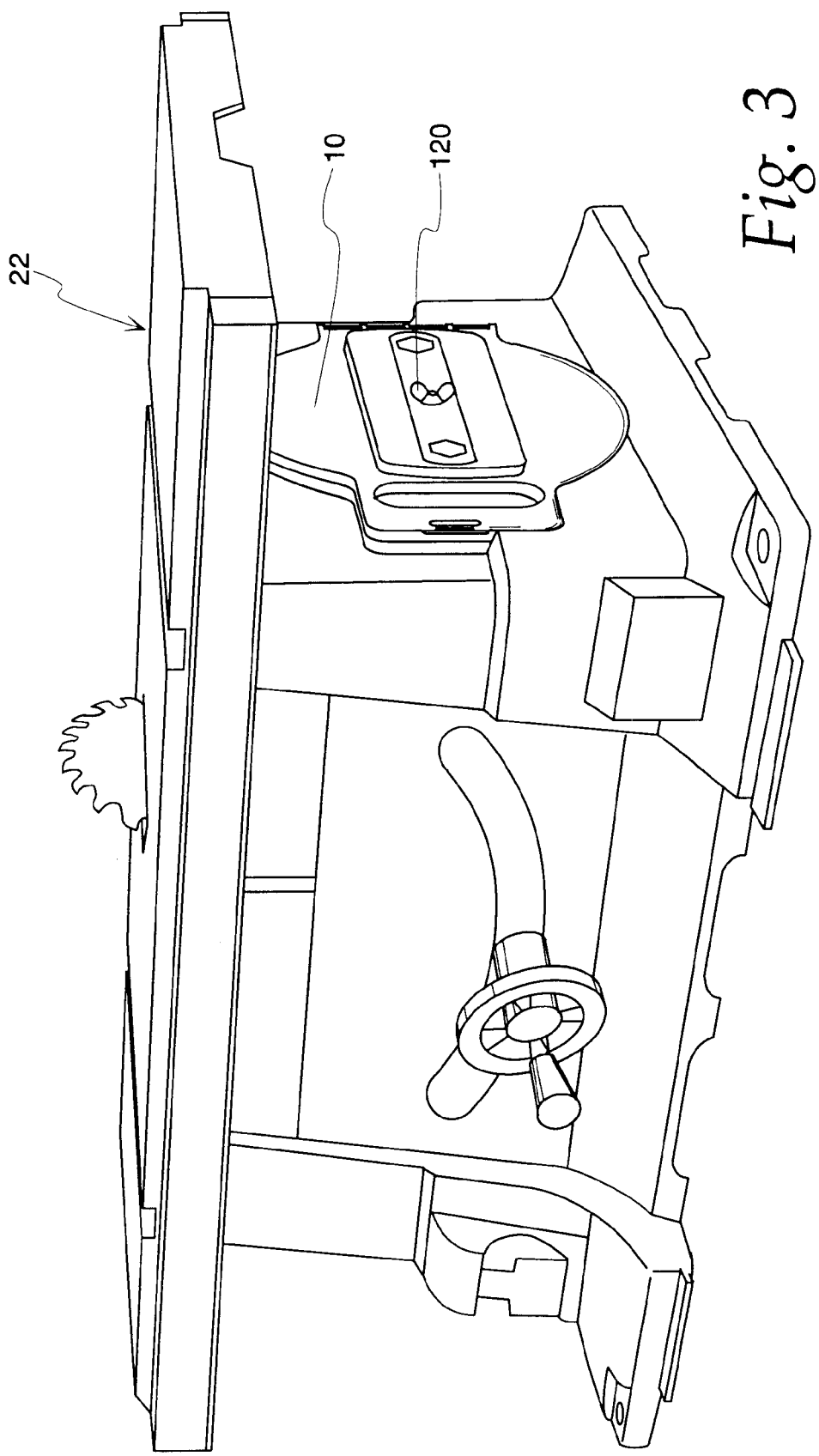
FIG. 3 illustrates the container of the present invention attached to the side of a table saw.

In FIGS. 1 and 2, a portable container 10 that is made in accordance with the principles of the present invention is shown. The container 10 is used to hold saw blades and accessories for use with a table saw. Base 12 and cover 14 are movably connected by a hinge 16 so that the container 10 has a generally clam-shell-type arrangement. The base 12 and cover pivot about the hinge 16 between a closed position, shown in FIG. 1, and an open position, shown in FIG. 2. In the closed position, the base 12 and the cover 14 form an internal cavity 15 in which the blades and table saw accessories held by the present invention are held. In addition, the base 12 and the cover 14 each have a handle portion 18 and 20, respectively, that mate in the closed position so that the container 10 can be easily carried by a user. In the closed position, the container can be removably connected to a side of a table saw 22, as illustrated in FIG. 3 and described in detail below.

Referring to FIGS. 2 and 6, the base handle portion 18 is integrally formed with generally circular center portion 24 and a hinge portion 26 to form the base. In the preferred embodiment, the base 12 is made of one sheet ABS of plastic or other suitable material. The center portion 24 has an outer side 28, an inner side 30 and a flange 32 extending perpendicularly around the perimeter of the inner side 30. Concentric ribs 33 can be configured on the inner side 30 to support a blade that is held by the container 10.

A tubular post 34 is configured at the center of circular portion and extends perpendicularly from the inner side 30. In an embodiment of the present invention, the past 34 is threaded around the outer surface. Accordingly, a nut 35, which can be made of the same material as the container, screws onto the post 34. The nut's outer surface can be knurled so that it is easy to grip. As the post is tubular, a hole 36 extends through the circular portion. The diameter of the tubular post 34 is approximately the size of a standard center hole found on saw blades (not shown). Accordingly, multiple saw blades slides and other tools, as described below over the post 34 to be held by the container 10. The nut 35 screws-onto the post 34 to secure the blades and other tools in the container 10.

The base hinge portion 26 extends out from the base's flange 32 and includes an extension 38 and multiple clips 40. As seen in FIG. 6, the clips 40 have a general C-shaped cross section. The clips 40 point in the same direction as the flange 32 and post 34.

The base handle portion 18 extends out from the base's outer side 28 to an outer edge 41 that is diametrically opposed to the hinge portion 26. The base handle portion 18 has an outer side 42, which is generally co-planar with the outer side 28, and an inner side 44 having a flange 46 surrounding its perimeter. For carrying, an ovular hole 48 is provided that, in the preferred embodiment, is adjacent the center portion 24.

To secure the container 10 in the closed position, the base handle portion 18 includes a snap latch 50 and a press-to-release button 52 between the outer edge 41 and the hole 48. The snap latch 50 extends generally perpendicularly from the inner side 44 and extends to its upper end 56. At the upper end 56, a triangular tab, or portion, 58 faces the outer edge 41. The triangular portion 58 is configured so that both the bottom and upper surfaces 60 and 62, respectively, are angled with respect to the inner side 42. The push-to-release button 52 is positioned between the snap latch 50 and the hole 48. As seen in FIG. 6, the button 52 has a generally rectangular cross-section that is open to the outer side 42. The snap latch 50 and button 52, with its open end, are arranged so-that when the button 52 is depressed the snap latch will be displaced downward and toward the button 52. In the preferred embodiment, an opening 66 can be provided:on the outer edge 48 so that the snap latch can be accessed when the container 10 is in the closed position.

Referring to FIGS. 2–7, the cover handle portion 20 is integrally formed with a generally circular center portion 70 and a cover hinge portion 72. In the preferred embodiment, the cover 14 is made of the same material as the base 12. The center portion 70 has an outer side 74, an inner side 76 and a flange 78 extending perpendicularly around the its perimeter. A hole 80 is configured at the center of circular portion. The diameter of the hole 80 is approximately the diameter of the post 34.

The cover hinge portion 72 extends out from the cover's flange 78 and includes an extension 82. Multiple bars 84 that are connected by supports 86 project from the extensions 82. As seen in the Figures, the bars 84 are approximately the same length as clips 40. As assembled, the clips 40 snap onto the bars 84 to form the hinge 16. As the base 12 and cover 14 are moved between the open and closed portion, the clips 40 move around the bars 84.

The cover handle portion 20 extends out from the cover's outer side 74 to an outer edge 88 that is diametrically opposed to the hinge portion 72. The cover handle portion 20 has an outer side 90, which is generally co-planar with the outer side 74, and an inner side 92 having a flange 94 surrounding its perimeter. For carrying the container, an ovular hole 96 is provided that, in the preferred embodiment, is adjacent the center portion 70.

The cover handle portion also includes ledge 98, tab 100 and hole 102. The ledge 98 is positioned on the outer edge 88 and projects toward the hole 96 from the edge of flange 94. As shown in FIG. 6, the ledge has an angled upper surface 99. The tab 100 projects out from outer edge 88 in the opposite direction from the ledge 98 and out from the outer edge 88. The hole 102 is positioned between the outer edge 88 and the hole 96 so that the button 52 extends through it when the container 10 is in the closed position. In the preferred embodiment, a slot 104 is provided in the flange 94 below the ledge 98 and tab 100. In the closed position, the snap latch 50 can be accessed from the slot 104.

The cover portion can also be provided with a raised portion 106 that extends above the outer side 74 and is open to the inner side 76. In the preferred embodiment, the raised portion has an elongated configuration is oriented between the handle portion 20 and the hinge portion 72. As seen, the hole 80 is positioned at the center of the raised portion. On the outer side of the raised portion, a pattern 107 of a flat wrench, which is used to attach a blade to the shaft of the table saw, can be formed into the material. On the inner side of the raised portion a longitudinal indent 108 is formed that corresponds to the shape of the flat wrench. The flat wrench is held within the container by the post 34.

On either side of the indent 108, the cover 14 is configured with sets of retaining tabs 110 that are used to hold table saw accessories, such as a pencil or Allen wrench, within the container 10. Each set of retaining tabs 110 includes multiple pairs of tabs 112. The lower end of each tab 112 is connected to the inner side of the cover 14 or raised portion 106. The outer end 114 of each tab includes a head portion 116 that arranged to face the head portion 116 of an opposing tab. The head portions for each set of retaining tabs 110 are arranged to hold a table saw accessory. In one embodiment, the tabs 112 of a first set 110 are spaced to hold an Allen wrench 118, and the tabs of a second set 110 are spaced to hold a flat pencil (not shown). A third set of tabs 110 can be included to hold a round pencil. The flat wrench, pencils, Allen wrench, and blades are the basic tools needed by a craftsperson to use the saw 22.

As the container is used, the base 12 and the cover 14 move between the open and closed positions. In the open position, blades slide over the post 34 so that they are held within the cavity 15. The center holes of the blades fit over the post 34. In the preferred embodiment, the post 34 is long enough to hold at least three blades. In addition, a flat wrench having a center hole, as seen in the outline of the wrench on the outer side 74 of the cover 14, slides over the post 34 to be held within the cavity 15. The nut 35 is then threaded over post 34 to securely fasten the flat wrench and the blades to the base 12. Various other table saw accessories can be inserted between the tabs so that they are also held within the cavity 15. Once the blades and accessories are removably attached to the container 10, the cover can be closed.

Figure 8:
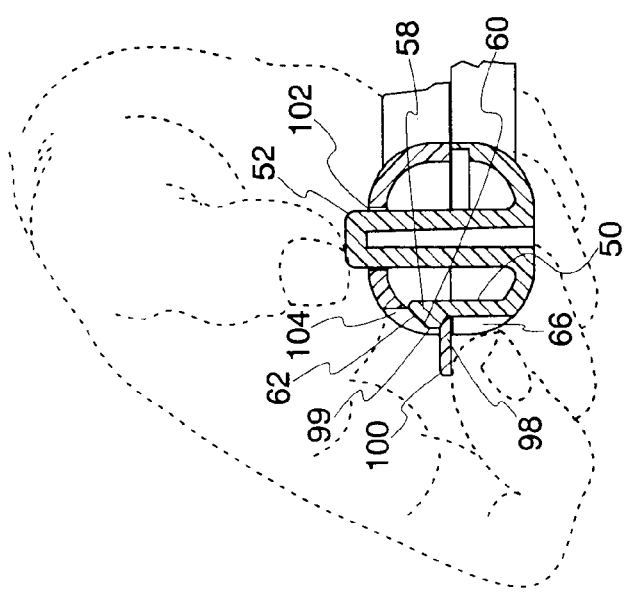
FIG. 8 demonstrates the snap latch and push-to-release button of the present invention in the closed position.

As the cover 14 is closed onto the base 12, the button 52 moves through the hole 102 so that it raised above the upper side of the cover handle portion's outer side 74. In addition, the snap latch 50 engages with the ledge 98. The ledge 98 first engages with the upper surface 62 of the ledge. Because that surface is angled, the snap latch 50 moves towards push button 52 so that the tab 58 slides over the ledge. The snap latch and ledge will then be configured as seen in FIGS. 6 and 8 and will secure the container 10 in its closed position.

As seen in FIG. 3, the container 10 can be removably attached to the table saw 22 by a wing bolt 120 or other suitable fastener. The wing bolt 120 fits through the hole 80 and the tubular post 34 through the hole formed on the outer side 28 of the base 12 and into a is hole (not shown) in the table saw. The wing bolt can be easily removed. In the preferred embodiment, the table saw is portable. The ability to removably attach the container 10 to the table saw 22 keeps all the tools used in the operation of the saw in one place for easy transport.

Figure 9:
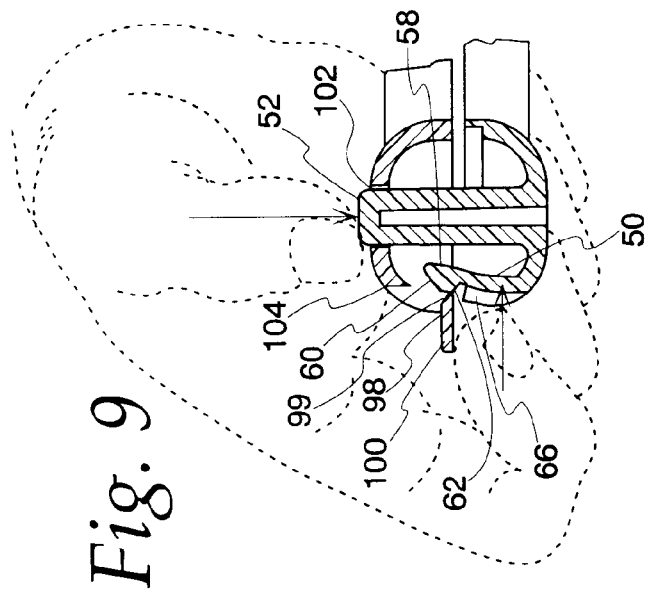
FIG. 9 demonstrates the snap latch and push-to-release button as it is being opened, and FIG. 10 demonstrates the snap latch and push-to-release button in the open position.
Figure 10:
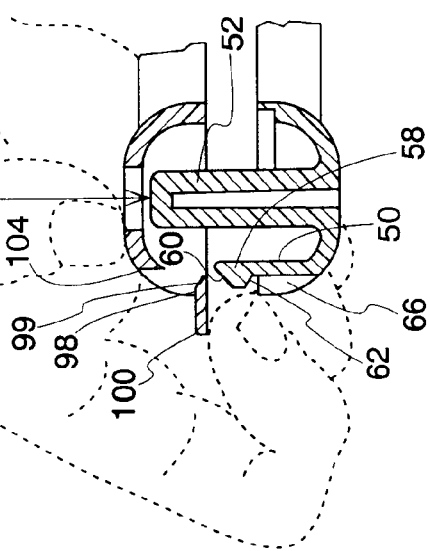

To open the container, the snap latch 50 needs to be disengaged from the ledge. The user will push down on the button 52. As described above and as seen in FIG. 9, this will displace the snap latch 52 so that the bottom surface 60 will slide from the angled upper surface 99. To assist the movement of the snap latch 50, the user can press on the portion of the latch exposed through opening 66. As shown in FIG. 10, the user then can simultaneously pull on the tab 100 to separate the base 12 and the cover 14.

Although the present invention has been described in considerable detail with reference to certain preferred versions, other versions are possible. Therefore, the spirit and scope of the appended claims should not be limited to the description of the preferred embodiment described.

What is claimed is:

1. A container for holding saw blades comprising:

a base having an outer side and an inner side with a flange extending around a perimeter of the inner side;

a cover having an outer side and an inner side with a flange extending around a perimeter of the inner side and a raised portion extending out from the outer side and open to the inner side, the raised portion adapted to contain a tool, the tool for use with a saw; and a set of retaining tabs positioned in the raised portion, the set of retaining tabs adapted to hold a second tool for use with the saw;

wherein the base and the cover are hingedly connected forming an inner cavity by the inner sides and the flanges so that the raised portion opens to the cavity, the cavity adapted to contain at least one saw blade, the base having a post extending perpendicularly from the inner side wherein a central aperture of the at least one saw blade slides over the post to hold the at least one saw blade in the cavity and a center hole extending through the post, the base and the cover, the center hole adapted to receive a bolt for securing the container to the saw.

2. A container for holding saw blades comprising:

a base having an outer side and an inner side with a flange extending around a perimeter of the inner side;

a cover having an outer side and an inner side with a flange extending around a perimeter of the inner side and having at least one set of retaining tabs, each at least one set having a pair of tabs to hold a tool against the inner side of the cover, the tool for use with a saw; and a hinge connecting the base and the cover between a closed position forming an inner cavity by the inner sides and the flanges and an open position, the cavity adapted to contain at least one saw blade, the base having a post extending perpendicularly from the inner side wherein a central aperture of the at least one saw blade slides over the post to hold the at least one saw blade in the cavity and a center hole extending through the post, the base and the cover, the center hole adapted to receive a bolt for securing the container to the saw.

3. The container according to claim 2 wherein each pair of tabs has a first tab having a head portion and a second tab having a head portion, the head portion of the first tab facing the head portion of the second tab.

4. The container according to claim 2 having a first set of retaining tabs to hold a pencil and having a second set of retaining tabs to hold an Allen wrench.

5. The container according to claim 1 wherein the cover includes a raised position above the outer side and exposed to the cavity to hold the tool over the post and within the cavity.

* * * * *